United States Patent
Haemel et al.

(10) Patent No.: US 9,569,197 B2
(45) Date of Patent: Feb. 14, 2017

(54) METHOD OF DISSEMINATING UPDATED DRIVERS TO MOBILE COMPUTING DEVICES AND A DISSEMINATION SYSTEM THEREFOR

(71) Applicant: Nvidia Corporation, Santa Clara, CA (US)

(72) Inventors: Nicholas Haemel, Santa Clara, CA (US); Cathy Donovan, Santa Clara, CA (US); Narayanan Swaminathan, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/613,477

(22) Filed: Feb. 4, 2015

(65) Prior Publication Data
US 2015/0154036 A1    Jun. 4, 2015

Related U.S. Application Data

(63) Continuation of application No. 13/895,166, filed on May 15, 2013, now Pat. No. 8,978,027.

(60) Provisional application No. 61/724,088, filed on Nov. 8, 2012.

(51) Int. Cl.
*G06F 9/445* (2006.01)
*G06F 13/10* (2006.01)
*G06F 9/44* (2006.01)

(52) U.S. Cl.
CPC ............. *G06F 8/65* (2013.01); *G06F 9/4411* (2013.01); *G06F 9/44505* (2013.01); *G06F 13/102* (2013.01)

(58) Field of Classification Search
CPC ..... G06F 13/102; G06F 17/30144; G06F 8/65
See application file for complete search history.

(56) References Cited

U.S. PATENT DOCUMENTS

| 7,065,769 B1* | 6/2006 | Tolopka ............... G06F 9/4415 710/8 |
| 7,164,907 B2 | 1/2007 | Cochran et al. |
| 7,689,205 B2 | 3/2010 | Toy et al. |

(Continued)

FOREIGN PATENT DOCUMENTS

| TW | 200531469 A | 9/2005 |
| TW | 200620005 | 6/2006 |

(Continued)

OTHER PUBLICATIONS

Webster's New World Computer Dictionary, 9$^{th}$ Edition (2001), pp. 111, 123.*

(Continued)

*Primary Examiner* — Brian W Wathen
(74) *Attorney, Agent, or Firm* — Kevin Brown; Parker Justiss, P.C.

(57) ABSTRACT

Disclosed herein are mobile computing devices that employ compatible updated drivers. In one embodiment, the mobile computing device includes: (1) a processor, (2) a driver library configured to store original drivers and updated drivers for applications on the mobile computing device, and (3) a driver selector configured to determine at least one driver from the original drivers or the updated drivers to use for running one of the applications.

12 Claims, 2 Drawing Sheets

(56) References Cited

U.S. PATENT DOCUMENTS

Figure 1:
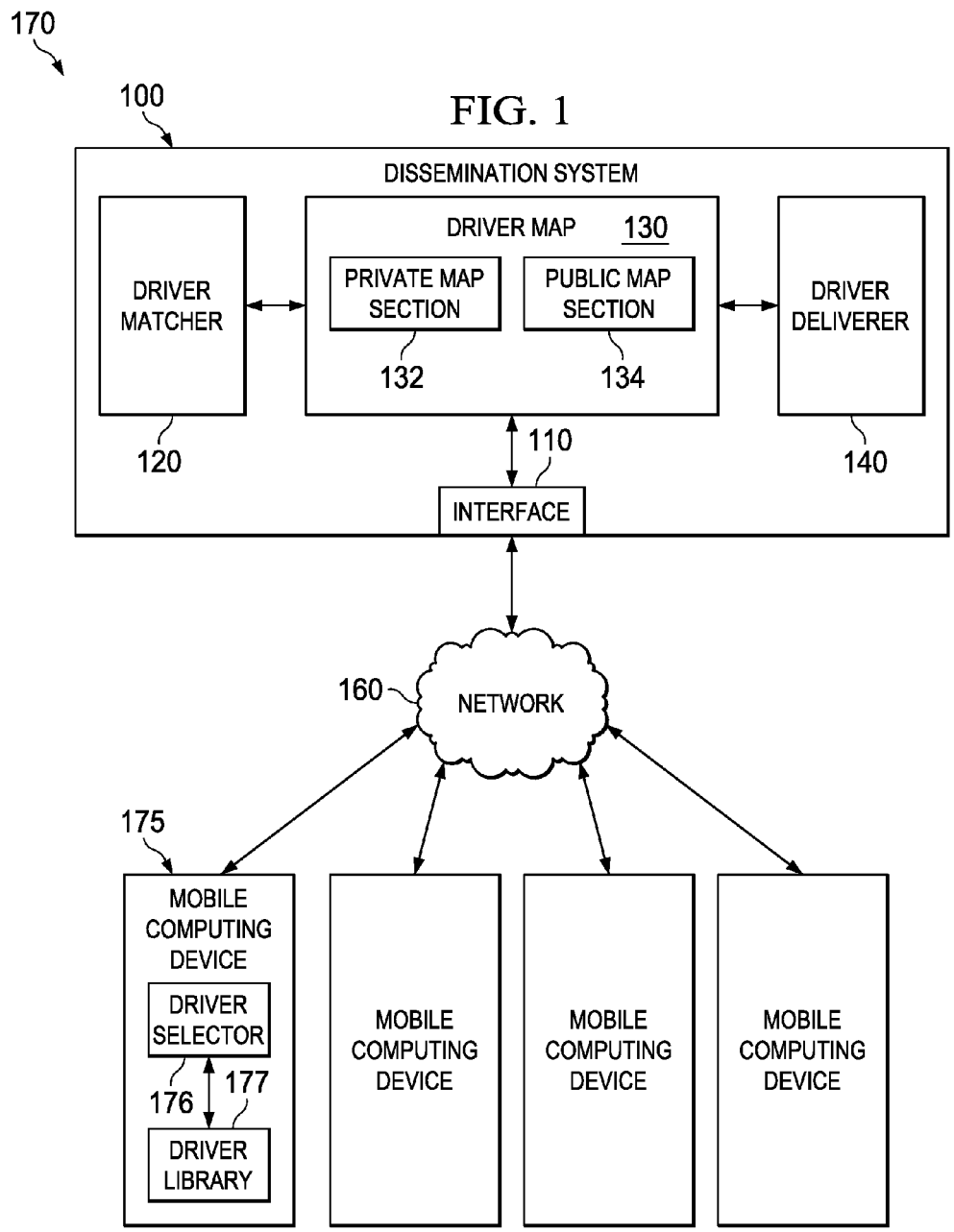

| | | |
|---|---|---|
| 8,402,321 B2 | 3/2013 | Olgaard et al. |
| 8,978,027 B2 | 3/2015 | Haemel et al. |
| 2002/0099952 A1 | 7/2002 | Lambert et al. |
| 2003/0037325 A1* | 2/2003 | Hargrove ................ G06F 8/61 717/175 |
| 2005/0132348 A1 | 6/2005 | Meulemans et al. |
| 2005/0149947 A1* | 7/2005 | Callender ............ G06F 9/4411 719/321 |
| 2005/0210459 A1 | 9/2005 | Henderson et al. |
| 2006/0274869 A1 | 12/2006 | Morse |
| 2007/0162731 A1 | 7/2007 | Toy et al. |
| 2007/0169129 A1* | 7/2007 | Polivy ................ G06F 9/44505 719/327 |
| 2007/0180445 A1 | 8/2007 | Greeff |
| 2008/0098094 A1 | 4/2008 | Finkelstein et al. |
| 2008/0201726 A1 | 8/2008 | Nagashima |
| 2009/0044185 A1* | 2/2009 | Krivopaltsev .......... H04L 29/06 717/173 |
| 2009/0064122 A1 | 3/2009 | Bielski |
| 2009/0210719 A1 | 8/2009 | Yoshida |
| 2009/0260004 A1 | 10/2009 | Datta et al. |
| 2009/0328008 A1 | 12/2009 | Mital et al. |
| 2010/0011380 A1 | 1/2010 | Dechovich et al. |
| 2011/0106527 A1 | 5/2011 | Chiu |
| 2012/0017208 A1* | 1/2012 | Lussier ................ G06F 8/65 717/174 |
| 2012/0036235 A1 | 2/2012 | Chan et al. |
| 2012/0096135 A1 | 4/2012 | Berube et al. |
| 2012/0115501 A1 | 5/2012 | Zheng |
| 2012/0278892 A1 | 11/2012 | Turbin |
| 2012/0302346 A1 | 11/2012 | Layne, IV et al. |
| 2013/0173885 A1 | 7/2013 | Watanabe et al. |
| 2013/0318498 A1 | 11/2013 | Mittal et al. |
| 2014/0129686 A1 | 5/2014 | Haemel et al. |
| 2014/0130064 A1 | 5/2014 | Haemel et al. |

FOREIGN PATENT DOCUMENTS

| | | |
|---|---|---|
| TW | 201208275 A | 2/2012 |
| WO | 2011162901 A2 | 12/2011 |

OTHER PUBLICATIONS

Orwick, P., et al., "Developing Drivers with the Windows Driver Foundation," Apr. 25, 2007, Microsoft Press, Chapter 2: Windows Driver Fundamentals (excerpt) pp. 1-5, 6 pages total, retrieved from http://techbus.safaribooksonline.com/9780735623743.

* cited by examiner

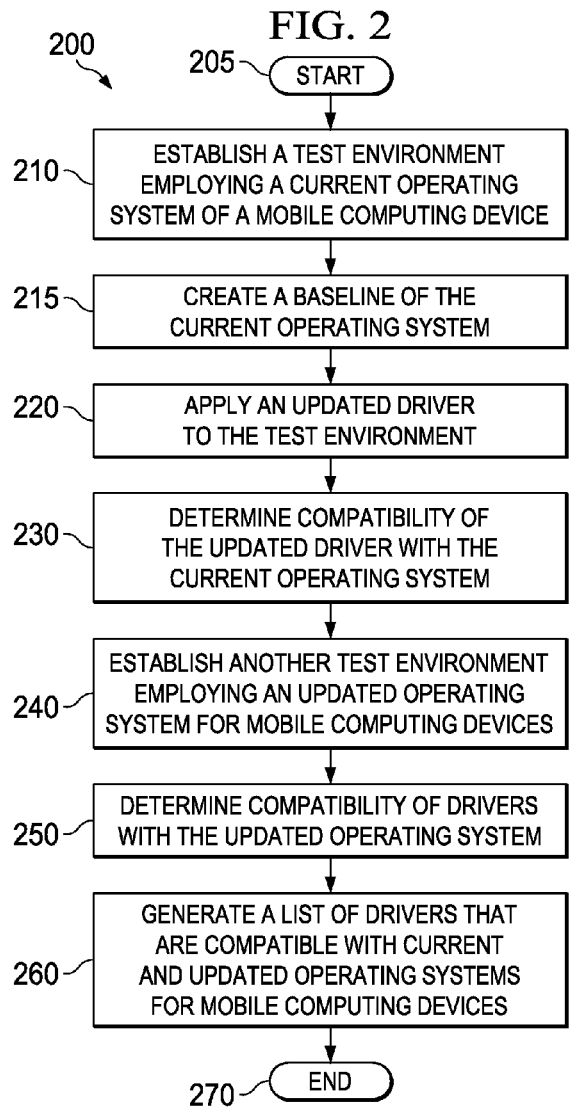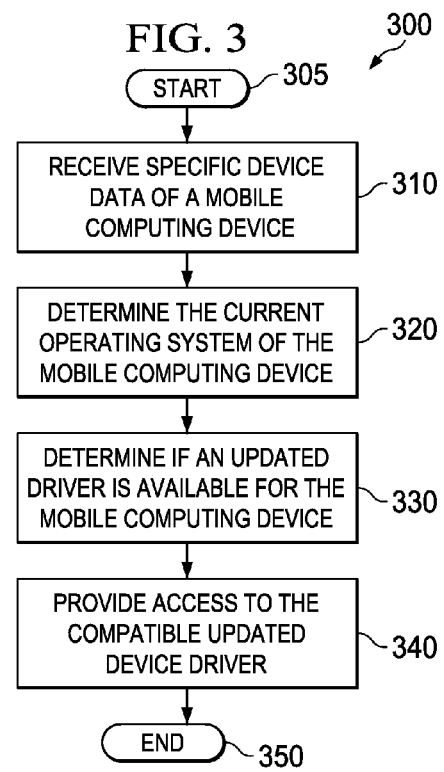

METHOD OF DISSEMINATING UPDATED DRIVERS TO MOBILE COMPUTING DEVICES AND A DISSEMINATION SYSTEM THEREFOR

CROSS-REFERENCE TO RELATED APPLICATION

This application is a continuation of U.S. patent application Ser. No. 13/895,166, entitled "METHOD OF DISSEMINATING UPDATED DRIVERS TO MOBILE COMPUTING DEVICES AND A DISSEMINATION SYSTEM THEREFOR", filed on May 15, 2013, by Nicholas Haemel, et al., which is currently pending and claims the benefit of U.S. Provisional Application Ser. No. 61/724,088, filed by Nicholas Haemel, et al., on Nov. 8, 2012, entitled "METHOD FOR DETERMINING DRIVER LIBRARY COMPATIBILITY AND DELIVERING UPDATES," wherein each of the above applications are commonly assigned with this application and incorporated herein by reference in their entirety.

TECHNICAL FIELD

This application is directed, in general, to drivers for mobile computing devices and, more specifically, to driver compatibility for mobile platforms.

BACKGROUND

Mobile telephones typically perform many functions in addition to providing voice communication. Many mobile telephones, such as smart phones, and other mobile computing devices also provide additional services including the ability to communicate by text, connect to the web, watch videos, make videos, take pictures, play games, etc. The various computing devices use many types of applications to perform these different functions.

The applications operate within the operating systems of the different mobile computing devices. An operating system manages and coordinates the resources and activities of the mobile computing device and provides an interface between a user and the hardware thereof. When a user launches an application, drivers for the various devices or modules of the mobile computing device are called and used to communicate commands and data between the application and the devices.

SUMMARY

In one aspect, a mobile computing device is disclosed. In one embodiment, the mobile computing device includes: (1) a processor, (2) a driver library configured to store original drivers and updated drivers for applications on the mobile computing device and (3) a driver selector configured to determine at least one driver from the original drivers or the updated drivers to use for running one of the applications.

In another embodiment a mobile computing device is disclosed that includes: (1) a memory configured to store original and updated drivers for applications of the mobile computing device and (2) a processor configured to select either an original driver or an updated driver for operating one of the applications.

BRIEF DESCRIPTION

Reference is now made to the following descriptions taken in conjunction with the accompanying drawings, in which:

FIG. 1 illustrates a system diagram of an embodiment of a dissemination system for updated drivers that is constructed according to the principles of the disclosure;

FIG. 2 illustrates a flow diagram of an embodiment of a method of determining compatibility between different versions of drivers and operating systems of a mobile computing device carried out according to the principles of the disclosure; and FIG. 3 illustrates a flow diagram of an embodiment of a method of disseminating drivers to mobile computing devices carried out according to the principles of the disclosure.

DETAILED DESCRIPTION

Typically, users of mobile computing devices want to enjoy the latest capabilities of an application. For example, a user wants the best graphics, fastest responses, newest features, etc., as soon as possible after development. As such, users download the updated version of an application to their mobile computing device to experience the latest features.

To fully appreciate the updated features, an updated version of a driver or drivers is often needed, too. Drivers for a mobile computing device, however, are specific for a particular operating system and cannot be updated individually since a device image for a mobile computing device is built as a single step with complex interdependencies between the operating system and other components of the device, such as, internal programming interfaces, implied component dependencies, and other architectural limitations. Thus, unlike the design of a personal computer, the operating system of a mobile computing device is within a single mobile platform image. Updating a device driver for a mobile operating system, therefore, typically requires a full device over-the-air (OTA) update of the entire mobile platform of the mobile computing device. A device OTA is expensive, time-consuming and frustrating since driver bugs or performance problems are often identified after a device ships.

Accordingly, this disclosure provides systems and methods for disseminating driver updates to mobile computing devices. A driver as used herein is a module driver or device driver for a mobile computing device. The systems and methods detect compatibility of device drivers with operating system builds (or versions) and deliver updated versions of the drivers deemed compatible. A compatible driver with respect to an operating system is a driver that operates within the operating system, correctly supporting internal and external APIs, and responding as expected to tests and queries without generating errors. In order to map driver compatibility to operating system builds, a test environment is established that uses a current build of an operating system and overlays updated driver builds for a given module or device. A specific driver module build can also be tested on new operating system builds using the test environment. In one embodiment, the test environment includes a regression system that applies a set of tests to the operating system and updated driver. A test harness can be used for the regression testing. The data from the ongoing regression testing creates a mapping of driver module compatibility with operating system builds, either updated or current operating system builds. In one embodiment, the regression system provides full functional testing of an operating system with a device driver.

A dissemination system disclosed herein can use the regression mapping along with specific device data to determine if an updated and compatible driver for a given module is available. In one embodiment, the specific device data includes current operating system build, module driver versions, kernel versions, hardware versions, API versions, etc., that sufficiently identifies the particular operating platform of a mobile computing device. Once the current operating system build is identified, the availability of updated, compatible drivers is determined. The updated drivers can then be provided to the mobile computing device by, for example, providing a link for the mobile computing device to retrieve. In some embodiments, the updated driver can be sent by the dissemination system to the mobile computing device. The dissemination system can provide access to an updated driver in response to a query from a mobile computing device or devices. In some embodiments, mobile computing devices are configured to periodically generate a query seeking updated driver versions. In other embodiments, updated drivers are broadcast to mobile computing devices. For example, a list of mobile computing devices are identified for available updated drivers. The mobile computing devices can be identified based on device analytics. A list is generated from the identified devices and the available updated drivers are then pushed to the identified mobile computing devices. The disclosure also considers the client side of driver compatibility. In one embodiment, when a driver should be loaded on a mobile computing device, such as the OpenGL driver, a shim driver is loaded instead. The loaded shim driver checks for the latest back-end implementation driver (e.g., downloaded via a link or shipped with an OTA) and then loads that library using an internal dispatch table. The table can be stored in a driver library of the mobile computing device. A driver selector of the mobile computing device can employ the shim driver to choose the driver for execution.

Turning now to the figures, FIG. 1 illustrates a system diagram of an embodiment of a dissemination system 100. The dissemination system 100 is configured to provide updated drivers to mobile computing devices according to the principles of the disclosure. As such, the dissemination system 100 is configured to detect compatibility of updated drivers with operating systems of mobile computing devices and also provide a mechanism for delivering compatible drivers to mobile computing devices. In one embodiment, the dissemination system 100 is implemented on a server. As such, the server includes the necessary processor, memory, logic, circuitry and communications interface to perform the functions of the dissemination system 100. The dissemination system 100 includes an interface 110, a driver matcher 120, a driver map 130 and a driver deliver 140. FIG. 1 also illustrates a network 160 and mobile computing devices 170 to illustrate the operation of the dissemination system 100. One of the mobile computing devices 170 is selected as a representative thereof and is denoted as mobile computing device 175.

The interface 110 is a communication interface that is configured to communicate with mobile computing devices. The interface 110 includes the necessary circuitry to transmit and receive data via, for example, a communications network such as the network 160. As such, the interface 110 is configured to communicate via communication protocols including, for example, networking protocols such as Ethernet, Wi-Fi or Internet protocol. The interface 110 is configured to communicate via wireless or wired connections.

The interface 110 is configured to receive queries generated by the mobile computing devices 170 that inquire of the availability of updated drivers that are compatible with the existing operating system thereof. The queries can be in a format that complies with conventional protocol standards. A query can include specific device data that indicates the operating system of the mobile computing device sending the query.

The interface 110 can also provide updated drivers that are compatible to the mobile computing devices 170. In one embodiment, the interface 110 can deliver a link from the driver deliverer 140 to requesting mobile computing devices 170 to use for downloading updated drivers that are compatible. In other embodiments, the interface 110 can deliver compatible updated drivers to the mobile computing devices 170. As such, the dissemination system 100 can store the updated drivers. In these embodiments, the driver map 130 can be used to store the updated versions. In other embodiments, another section of memory or another memory of the dissemination system 100 can be used to store the updated drivers. The interface 110 can also be configured to receive uploads of updated drivers and operating systems from developers or manufacturers. The updated drivers and operating system can be used by the device driver mapper 120 to determine compatibility between drivers and operating system builds. The device driver mapper 120 can also be used to direct storing of the received uploads in a memory of the dissemination system 100.

The driver matcher 120 is configured to determine system compatibility between different versions of drivers and operating systems of a mobile computing device. The driver matcher 120 can establish a test environment for determining compatibility. A test harness and regression testing can be employed. In one embodiment, the driver matcher 120 is configured to determine the compatibility of an updated driver with a current operating system of a mobile computing device based on both direct compatibility and implied compatibility of the updated driver with the current operating system. Direct compatibility is based on a binary check of the updated driver program. Implied compatibility is based on a check of the dependencies and rules associated with the updated driver program; it is a check to determine if assumptions have changed.

In one embodiment, the driver matcher 120 is configured to determine direct compatibility by detecting changes to entry points of an application programming interface (API), or multiple APIs, associated with the updated driver and the current operating system. An API is used to define the way or procedure by which an application program or system module requests services from the libraries or the operating system or other components of a mobile computing device. By examining the entry points of the APIs, the driver matcher 120 can determine if the updated driver includes functions that have been changed which support exports thereof. If no export changes are detected for each of the APIs (a null set), then the driver matcher 120 verifies direct compatibility. If a change to an API entry point is detected, then the driver matcher 120 determines the updated driver is not directly compatible with the current operating system. In one embodiment, the driver matcher 120 does not determine implied compatibility unless first confirming direct compatibility. As such, a determination of direct incompatibility results in a determination of system incompatibility. In such embodiments, if direct compatibility is determined, the driver matcher 120 then proceeds to determine implied compatibility; if direct compatibility is not determined, the driver matcher 120 indicates incompatibility.

The driver determiner 120 is also configured to determine implied compatibility of an updated driver with a current operating system build. For the direct compatibility, the device driver mapper 120 programmatically examines the updated driver by examining the binary program or library to determine if API changes exist. For implied compatibility, the device driver mapper 120 examines the implied dependencies of the updated driver with the current operating system. The implied compatibility check, therefore, detects if rules or assumptions have changed even if the APIs have not changed. In one embodiment, the driver matcher 120 determines implied compatibility via regression testing of the current operating system with the updated driver. For the regression testing, a set of tests are applied to determine if all of the implied rules associated with the updated driver comply with the current operating system. The set of tests can include quality, performance and power tests. In some embodiments, the same set of tests originally used by the OEM to determine driver compliance with the operating system is used. If the results are the same as with the original device driver, then the driver matcher 120 determines that the updated driver has implied compatibility.

The driver map 130 includes a list of device drivers deemed compatible for particular operating systems. The driver map 130 is populated by the driver matcher 120 based on the system compatibility determined by the driver matcher 120. The driver map 130 can be implemented as a list that includes various operating system versions currently being used on mobile computing devices and the updated drivers that are compatible therewith. In one embodiment, the driver map 130 is implemented as a searchable database stored on a memory of a server or a memory associated with a server.

In one embodiment, driver matcher 120 operates multiple times each day. In some embodiments, driver matcher 120 runs every time a device driver or operating system changes. As such, the driver matcher 120 could run hundreds of times a day. Each of these results can be stored in the driver map 130.

In some embodiments, the driver map 130 is divided into two sections. A first section is a private map section 132 that is configured to store all data from the driver matcher 120. The second section is a public map section 134 that is configured to include a subset of the content, e.g., device drivers, stored on the private map section 132. In one embodiment, the content of the private map section 132 is reviewed and a portion is selected to be placed in the public map section. The review process can begin by determining a device or class of devices to update. A quality analysis of the selected device or class of device is then performed. Based thereon, the device drivers on the public map section 134 are updated. In some embodiments, the review process is manually performed.

The driver deliver 140 is configured to determine if the driver map 130 includes an updated driver that is compatible with a current operating system and hardware configuration of a mobile computing device. In one embodiment, the driver deliverer 140 is further configured to provide instructions for the mobile computing device to obtain the updated driver when available. The driver deliverer 140 can transmit a link to the mobile computing devices 170 to be used to download the compatible updated driver. In some embodiments, the driver deliverer 140 can transmit the compatible updated driver to applicable mobile computing devices.

The driver deliverer 140 is configured to search the driver map 130 based on a query from a mobile computing device. The query includes specific device data that indicates the current operating system and hardware configuration of the mobile computing device. The driver deliverer 140 uses the current operating system to search the driver map 130 to determine if there are any compatible updated drivers for that particular current operating system. If so, the driver deliverer 140 proceeds to provide access to the updated driver for the mobile computing device.

The communications network 160 is a conventional network that is used by the dissemination system 100 to transmit and receive data, including uploads, downloads, queries, etc. As illustrated in FIG. 1, the mobile computing devices 170 can communicate with the dissemination system 100 via the communications network 160. The interface 110 and the mobile computing devices 170 include the necessary circuitry to communicate over the communications network 160 employing the proper networking protocol.

The mobile computing devices 170 are computing devices constructed specifically for a mobile architecture that enables portability. The mobile computing devices 170 include mobile hardware and software that is configured to perform various functions including communicating with the dissemination system 100. The mobile computing devices 170 can be smart phones, tablets, clamshells, game devices, etc. Each of the mobile computing devices 170 includes at least one processor and memory. One skilled in the art will also understand that each of the mobile computing devices 170 include other components that are typically included in such devices including a display, user interface, power supply, communications interface, etc.

In addition to conventional components, the mobile computing device 175 includes a driver selector 176 and a driver library 177. In one embodiment, the driver selector 176 is implemented on a processor of the mobile computing device 175 and the driver library 177 is implemented on a database of a memory of the mobile computing device 175. The driver selector 176 is configured to determine the driver or drivers to use with a particular application. In one embodiment, the driver selector 176 can employ a list that pairs applications with drivers. The list can be a whitelist that includes, for example, the applications that will use the original drivers installed on the mobile computing device 175. If not on the list, then the driver selector 176 can choose or automatically default to an updated driver deemed compatible for a non-listed application. The list can be loaded by the OEM to insure certain applications will always use the original drivers.

In other embodiments, the list can include applications that only work with an updated driver. As such, the device selector 176 can optimize operation of an application by choosing which application to use with which drivers. The dissemination system 100 can generate the list (e.g., list from the driver map 130) and send the list to the mobile computing device 175. The mobile computing device 175 can use the received list and provided updated drivers for executing applications.

In one embodiment, the driver selector 176 employs a shim driver for each application. The shim driver or shim layer detects launching of an application and obtains a driver for the application by looking at the list, determining if an updated driver is applicable and parsing a directory of the driver library 177 to fetch the chosen driver to use for execution. The chosen driver can be an updated driver. In one embodiment, the driver selector 176 reads a text file that indicates the directory to search. The shim driver can be loaded on the mobile computing device 176 during an OTA. In another embodiment, the shim driver can be stored in a database that is accessible by the mobile computing device 175.

The driver library 177 is configured to store the original drivers and the updated drivers. The driver selector 176 can determine which driver to use for an application and select that chosen driver from the driver library 177. The shim driver can then invoke the chosen driver when executing an application. In other embodiments, another component of the mobile computing device 175 is configured to swap drivers out by adjusting dynamic links or moving files around in the operating system.

FIG. 2 illustrates a flow diagram of an embodiment of a method 200 of determining compatibility between different versions of device drivers and operating systems of a mobile computing device carried out according to the principles of the disclosure. In one embodiment, the method 200 may be carried out by a dissemination system as disclosed herein. For example, the dissemination system 100 or at least a portion thereof may include the necessary circuitry, operating instructions or combination thereof to perform the steps of the method 200. In parts, the method 200 refers to a single driver. One skilled in the art will understand that the method 200 can be used to determine compatibility of multiple updated drivers with current operating systems and determining compatibility of multiple current drivers with updated operating systems. The method 200 begins in a step 205.

In a step 210, a test environment is established employing a current operating system of a mobile computing device. The test environment is based on a current operating system build. In some embodiments, the test environment is a test harness based on the current operating system build. The test harness can employ tests to execute and test the entire functional feature set of the current operating system with an updated driver.

In a step 215, a baseline is created for the current operating system. The baseline for the current operating system is established in the test environment by running the original device driver paired with the current operating system. An updated driver is applied to the test environment in a step 220. The updated driver can be overlaid on the current operating system in the test environment.

In a step 230, compatibility of the updated driver with the current operating system is determined. The compatibility is determined employing the test environment and is based on both direct and implied compatibility of the updated driver with the current operating system. In one embodiment, determining system compatibility is based on detecting changes to entry points of an application programming interface associated with the updated driver and the current operating system. In some embodiments, determining implied compatibility is not performed unless direct compatibility is first confirmed. In some embodiments, determining implied compatibility includes regression testing of the current operating system with the updated driver.

In a step 240, another test environment employing an updated operating system for mobile computing devices is established. This test environment can have the same format as the test environment of step 210 except this test environment is based on an updated operating system instead of a current operating system.

Compatibility of a current driver with the updated operating system is determined in a step 250 employing this other test environment. Multiple drivers can be tested with the updated operating system to determine compatibility with the updated operating system.

In a step 260, a list of drivers is generated that are compatible with current and updated operating systems for mobile computing devices. The list can be saved as a driver map of a dissemination system. The list can also be sent to mobile computing devices for use when executing applications. The method 200 ends in a step 270.

FIG. 3 illustrates a flow diagram of an embodiment of a method 300 of disseminating device drivers to mobile computing devices carried out according to the principles of the disclosure. A dissemination system as disclose herein can perform the method 300 or at least portions thereof. As such, a dissemination system, e.g., the dissemination system 100, or at least a portion thereof may include the necessary circuitry, operating instructions or combination thereof to perform the steps of the method 300. The method 300 begins in a step 305.

In a step 310, specific device data of a mobile computing device is received. The specific device data indicates the current operating system of the mobile computing device. The device data can be received from a query generated and transmitted by the mobile computing device.

The current operating system of the mobile computing device is determined in a step 320. The determination can be based on the received specific device data.

In a step 330, a determination is made if an updated driver is available for the mobile computing device that is compatible with the current operating system that has been determined. In one embodiment, determining the availability and compatibility of updated drivers includes checking a driver map that lists compatible drivers for particular operating systems. The list can include a range of compatible versions of drivers available for the determined operating system. In one embodiment, the list or a portion of the list thereof is generated by determining direct and implied compatibility of the updated drivers with the current operating system.

If a compatible updated driver is available, access to the updated driver is provided to the mobile computing device in a step 340. Access can be provided by transmitting location information, such as a link, for downloading the updated driver or by transmitting the updated driver. In one embodiment, access to an updated driver is not provided if the mobile computing device already includes the updated driver. This can be determined by communicating queries between the dissemination system and the mobile computing device. The method 300 ends in a step 350.

A portion of the above-described apparatuses, systems or methods may be embodied in or performed by various processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions of the apparatuses or systems described herein.

Portions of disclosed embodiments may relate to computer storage products with a non-transitory computer-readable medium that have program code thereon for performing various computer-implemented operations that embody a part of an apparatus, system or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A mobile computing device, comprising:
   a processor;
   a driver library configured to store original drivers and updated drivers for applications on said mobile computing device; and
   a driver selector configured to employ a list to determine at least one driver from said original drivers or said updated drivers to use for running one of said applications, wherein said list pairs at least some of said applications with some of said original drivers and said driver selector chooses one of said updated drivers when said one of said applications is not on said list.

2. The mobile computing device as recited in claim 1 wherein when said one of said applications is not on said list, said driver selector automatically defaults to one of said updated drivers deemed compatible with said one of said applications.

3. The mobile computing device as recited in claim 1 wherein said driver library receives said updated drivers via a link.

4. The mobile computing device as recited in claim 1 wherein compatibility of said updated drivers with said at least one application is determined by direct and implied compatibility with a current operating system of said mobile computing device.

5. A mobile computing device, comprising:
   a memory configured to store original and updated drivers for applications of said mobile computing device; and
   a processor configured to select either an original driver or an updated driver for operating one of said applications, wherein said processor employs a shim driver for operating said one of said applications, and said shim driver detects launching of said one of said applications and obtains either said original driver or said updated driver by parsing a directory of libraries stored on said memory.

6. The mobile computing device as recited in claim 5 wherein said shim driver is stored on said mobile computing device.

7. The mobile computing device as recited in claim 5 wherein said mobile computing device receives said shim driver during an over-the-air update.

8. The mobile computing device as recited in claim 5 wherein compatible updated drivers are based on both implied and direct compatibility.

9. The mobile computing device as recited in claim 5 wherein said processor determines if said updated driver is applicable for operating said one of said applications based on a current operating system of said mobile computing device.

10. A mobile computing device, comprising:
    a processor;
    a driver library configured to store original drivers and updated drivers for applications on said mobile computing device; and
    a driver selector configured to employ a list to determine at least one driver from said original drivers or said updated drivers to use for running one of said applications, wherein said list pairs at least some of said applications with some of said updated drivers and includes said applications that only work with one of said updated drivers.

11. The mobile computing device as recited in claim 10 wherein said driver library receives said updated drivers via a link.

12. The mobile computing device as recited in claim 10 wherein compatibility of said updated drivers with said at least one application is determined by direct and implied compatibility with a current operating system of said mobile computing device.

* * * * *